(12) United States Patent
Nolterieke et al.

(10) Patent No.: US 8,243,611 B2
(45) Date of Patent: Aug. 14, 2012

(54) METHOD AND SYSTEM FOR CONFIGURING A DEVICE THAT HAS FAILED TO OBTAIN NETWORK ADDRESS

(75) Inventors: Michael H. Nolterieke, Raleigh, NC (US); David B. Rhoades, Raleigh, NC (US); Norman C. Strole, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 11/566,464

(22) Filed: Dec. 4, 2006

(65) Prior Publication Data
US 2008/0130646 A1 Jun. 5, 2008

(51) Int. Cl.
*H04L 12/26* (2006.01)
(52) U.S. Cl. ........ 370/252; 370/254; 370/255; 370/256; 370/257; 370/258; 370/352; 370/443; 370/453; 370/462; 370/475; 709/217; 709/218; 709/219; 709/220; 709/221; 709/225; 709/228; 709/229; 709/245
(58) Field of Classification Search ........................ None
See application file for complete search history.

(56) References Cited

U.S. PATENT DOCUMENTS

| | | | |
|---|---|---|---|
| 5,557,748 A | 9/1996 | Norris | |
| 5,724,510 A * | 3/1998 | Arndt et al. | 709/220 |
| 6,115,545 A | 9/2000 | Mellquist | |
| 6,345,294 B1 * | 2/2002 | O'Toole et al. | 709/222 |
| 6,810,420 B1 * | 10/2004 | Buse et al. | 709/224 |
| 7,366,898 B2 * | 4/2008 | Evans et al. | 713/160 |
| 2005/0055575 A1 | 3/2005 | Evans et al. | |
| 2005/0185589 A1 * | 8/2005 | Berbam et al. | 370/241 |
| 2006/0250982 A1 * | 11/2006 | Yuan et al. | 370/254 |
| 2008/0294797 A1 | 11/2008 | Nolterieke et al. | |

OTHER PUBLICATIONS

Office Action Dated Feb. 12, 2010 in Application No. 200710186753. 6, China.

* cited by examiner

*Primary Examiner* — Anh-Vu H Ly
*Assistant Examiner* — Aixa A Guadalupe Cruz
(74) *Attorney, Agent, or Firm* — H. Barrett Spraggins; Cynthia G. Seal; Biggers & Ohanian, LLP.

(57) ABSTRACT

Method and system for configuring a device that has failed to obtain a network address. In one aspect of the invention, a method for remotely configuring a device includes attempting to obtain a network address from a network server over a network, and receiving a valid network address over the network from a remote device connected to the network in response to failing to obtain the network address from the network server.

22 Claims, 2 Drawing Sheets

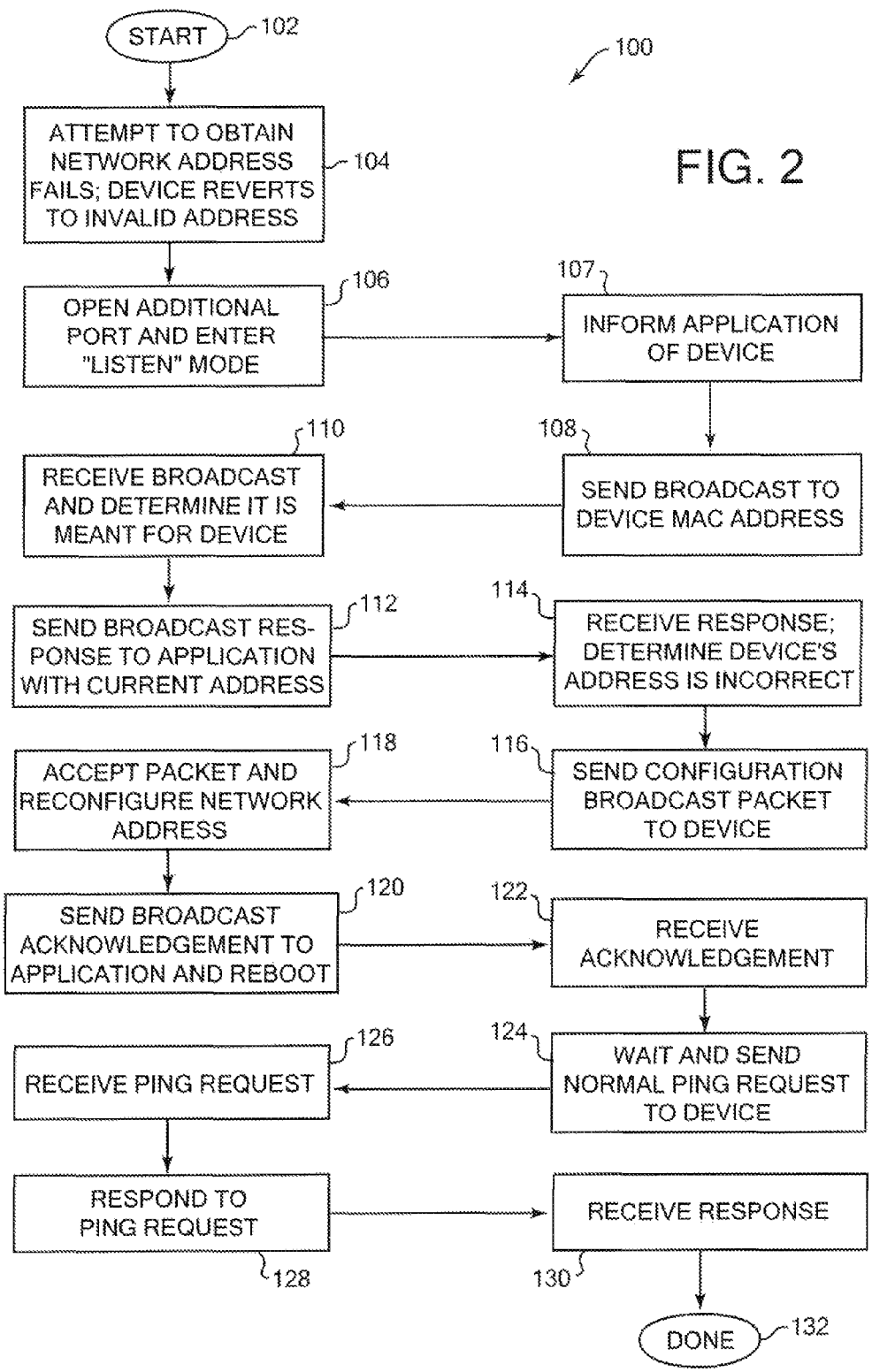

METHOD AND SYSTEM FOR CONFIGURING A DEVICE THAT HAS FAILED TO OBTAIN NETWORK ADDRESS

FIELD OF THE INVENTION

The present invention relates to devices connected to a computer network, and more particularly to configuring devices to communicate on a computer network.

BACKGROUND OF THE INVENTION

Computers and other electronic devices can communicate with other electronic devices over a communication network. Network protocols have been developed to enable such communication. One such network protocol is called Dynamic Host Configuration Protocol (DHCP), which is a protocol allowing a device to request and obtain an Internet address from a server which has a list of addresses available for assignment. A device can use DHCP to obtain a unique Internet Protocol (IP) address from a DHCP server, typically when the device first becomes active on the network, e.g., when the device is connected to a network or is rebooted. All IP addresses are ensured by the DHCP server to be unique so that each device can be individually addressed on the Internet. For DHCP to function properly, a DHCP server must be already established on the network and an operational network path must exist between the DHCP server and the device that has joined the network. For example, systems management devices such as the Remote Supervisor Adapter (RSA) II from IBM Corp., the BladeCenter Management Module and Advanced Management Module from IBM Corp., and server Baseboard Management Controllers (service processors), all use default behavior that attempts to receive a DHCP address when the devices first join the network.

In typical operation, the newly-connected device sends out a request to the network server on a local network, and the server responds by providing an IP network address to the requesting device, allowing the device to communicate with other devices over an IP network such as the Internet. However, in some cases the device request may fail, e.g., due to failure of the DHCP server or a disruption of the network path between device and the DHCP server (for example, the DHCP server may not exist on the network). A requesting device receiving no response from a DHCP server can fall back to a predefined static IP address after a predetermined period of time without receiving a response. For example, after 2 minutes, a reserved IP address of 192.168.7.125 can be reverted to as the default address, which is behavior recommended by the DHCP protocol standard. When this occurs, the device is left sitting on the network with a non-routable IP address, and cannot communicate with any other servers or devices.

If the device had a valid IP address, it would be allowed to communicate over the network. Thus, to remedy the situation, a user can try to configure the device with a valid IP address. However, since the device cannot be communicated with over the network, a remote user is prevented from connecting to the device. The only way the user can configure a static IP address when the device is in such a state is to physically visit the device and connect an appropriate device to perform the configuration. For example, a portable computer or mobile computer can be physically connected to a network port or serial port on the device to configure it and provide a valid network address (e.g., the portable computer can even include a network server that provides an address to the device). However, this can be inconvenient when a device fails to obtain a valid network address and the administrator is not located close to the failing device to manually configure it.

Accordingly, what is needed is the ability to configure the network address of a device remotely when the device is using an invalid default network address. The present invention addresses such a need.

SUMMARY OF THE INVENTION

The invention of the present invention relates to configuring devices to communicate on a computer network. In one aspect of the invention, a method for remotely configuring a device includes attempting to obtain a network address from a network server over a network, and receiving a valid network address over the network from a remote device connected to the network in response to failing to obtain the network address from the network server.

In another aspect of the invention, a method for remotely configuring a device includes receiving an indication at an application running on a remote device that the device has failed to obtain a network address from a network server over a network and sending a packet to be received by the device over the network, the packet including a valid network address for the device to allow the device to configure itself with the valid network address. A similar aspect of the invention is provided for a computer program product comprising a computer readable medium including program instructions for implementing similar features.

In another aspect of the invention, an apparatus for remotely configuring a device includes a mechanism operative to attempt to obtain a network address from a network server over a network and a mechanism operative to receive a valid network address from a remote device connected to the device over the network in response to failing to obtain the network address from the network server.

The present invention allows a remote management device to reconfigure a device that has failed to obtain a valid network address from a network server. This allows a remotely-connected user to reconfigure the device over a network without requiring a user physically close to the device to manually connect to and reconfigure the device.

BRIEF DESCRIPTION OF THE FIGURES

FIG. 2 is a flow diagram illustrating a method of the present invention for configuring a device over a computer network after the device has failed to obtain a network address.

DETAILED DESCRIPTION

Figure 1:
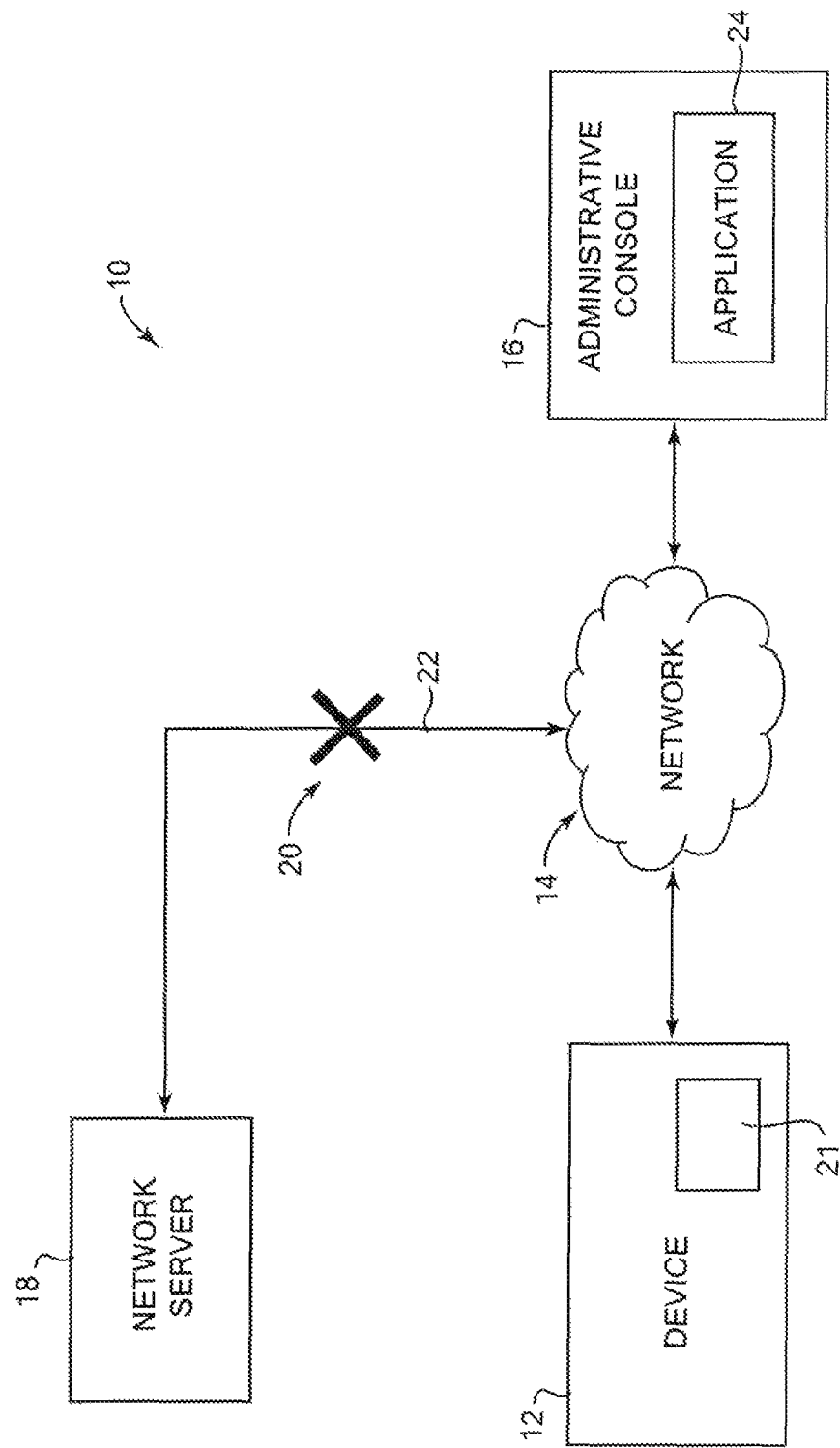
FIG. 1 is a block diagram illustrating a system suitable for use with the present invention.

The present invention relates to devices connected to a computer network, and more particularly to configuring devices to communicate on a computer network. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system implementations usable with the present invention can take a number of different forms. The present invention will also be described in the context of particular methods having certain steps. However, the method and system operate effectively for other methods having different and/or additional steps not inconsistent with the present invention.

The invention can take the form of an entirely hardware embodiment, an entirely software embodiment or an embodiment containing both hardware and software elements. A software embodiment can include but is not limited to firmware, resident software, microcode, etc. Furthermore, the invention can take the form of program instructions or code stored by a computer-readable medium for use by or in connection with a computer or any instruction execution system. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and DVD.

To more particularly describe the features of the present invention, please refer to FIGS. 1 and 2 in conjunction with the discussion below.

FIG. 1 is a block diagram illustrating a system 10 suitable for use with the present invention. System 10 includes a device 12, a network 14, and an administrative console 16. In some embodiments, a network server 18 may be present as well.

Device 12 can be any suitable computer system, server, or electronic device. For example, the device 12 can be a mainframe computer, desktop computer, workstation, portable computer, or electronic device (cell phone, personal digital assistant, audio player, game device, etc). In some embodiments, device 12 is a systems management device that can be used to help manage network services and systems. For example, systems management devices such as the Remote Supervisor Adapter (RSA) II from IBM Corp., the BladeCenter Management Module and Advanced Management Module from IBM Corp., and server baseboard Management Controllers (BMCs) (service processors) can be used as device 12. These devices can, for example, allow system and network management functions, control a remote server, receive system alerts, check server status, etc.

Device 12 can include one or more microprocessors to execute program code and control basic operations of the device 12, including processing operations, manipulating data, issuing commands to other components of the device 12, etc. One or more operating systems can run on the device 12, implemented by the microprocessor and other components of the device 12. The operating system is software running on the microprocessor that performs operational tasks including input/output operations to I/O devices, controlling and implementing usage of storage devices, and maintaining the operating environment for other programs. The operating system can be one of many different types.

Device 14 can include any peripheral, card, or interface device that performs a function and communications with the device 12 and operating system, typically using a standard communication protocol. One task of the device 14 relevant to the present invention is communication over one or more computer networks. Thus, networking components are also coupled to or including in the computer system 12, such as a network adapter that enables the device 12 to communicate with other devices through intervening private or public networks.

Device 12 is programmed to request a network address when the device is first connected to the network 14. The device 12 attempts to communicate with a network server, such as network server 18, which provides unique network addresses to requesting devices on the network. For example, in the example embodiment the network protocol used is DHCP, and the network server 18 is a DHCP server that provides network addresses for communication over an IP network. Other protocols and standards can be used in other embodiments.

In a situation relevant to the present invention, the device 12 is not able to communicate with any network server 18, as represented by symbol 20. This inability to communicate can be due to any of a variety of different reasons, including a failure of the server 18, a failure or disruption of the network path 22, or the lack of any network server 18 on the network 14 connected to the device 12. After such a failure to contact a network server, the device 12 reverts to a predetermined, default network address that, for example, is non-routable. For example, when using DHCP, the device 12 can revert to a predefined static IP address of 192.168.70.125 after 2 minutes, which is behavior recommended by the DHCP standard. Such an address cannot be found or communicated with over an IP network. Other appropriate addresses can be assumed in other embodiments, or no address can be assumed, as relevant to a particular embodiment.

In the present invention, a device 12 having adopted the default network address after failure of contacting the network server, runs a program 21 which can be implemented as firmware, software, or other appropriate form on the device. Program 21 controls the device to listen for communication signals from an administrative console 16, as described in greater detail below.

Network 14 is provided to allow communication between various devices. For example, in the described embodiment, the network 14 is an IP network, e.g., the Internet. Other protocols and network types can be used in other embodiments. Network 14 can be implemented with physical connections such as cables or wires, and/or can be implemented wirelessly via electromagnetic signals transmitted through the air.

Administrative console 16 is a computer system or other electronic device that is connected to the network 14 and can communicate with devices on the network. Console 16 can include standard components for an electronic device, including components as described above for device 12. A user can operate the console 16 to oversee the operation of the network 14 and particular devices connected to the network. Typically, the user at the console 16 will know that the device 12 has been connected to the network, and will also be aware that the device 12 has reverted to an invalid network address after failing to obtain a network address from any network server 18. The user can thus initiate and use an application 24 of the present invention to allow the user to configure the device 12 and provide it with a valid network address. A method for performing this configuration is described in greater detail below with respect to FIG. 2.

FIG. 2 is a flow diagram illustrating a method 100 of configuring a device over a computer network after the device is failed to obtain a network address. As presented in FIG. 2, the method 100 is described as a communication protocol implemented both by the device 12 and the application 24 provided on a remote system. The steps shown on the left side of the figure (steps 104, 106, 110, 112, 118, 120, 126 and 128)

are performed by the device 12, while the steps shown on the right side of the figure (steps 107, 108, 114, 116, 122, 124, and 130) are performed by or for the application 24.

Method 100 can be implemented by program instructions or code provided for the device 12 and application 24, where the instructions can be stored by a compute readable medium. The medium can be an electronic, magnetic, optical, electromagnetic, infrared, or semiconductor medium or a propagation medium, including a semiconductor or solid state memory, magnetic tape, a removable computer diskette, a random access memory (RAM), a read-only memory (ROM), a rigid magnetic disk and an optical disk (CD-ROM, DVD, etc.). Alternatively, the method 100 or portions thereof can be implemented in hardware (logic gates, etc), or in a combination of hardware and software. For example, the steps applicable to the device 12 can be performed by the program 21 (which can be software and/or hardware, e.g. firmware) running on the device 12, and the steps applicable to the application 24 are implemented by that application on the administration console 16.

The method starts at 102, and in step 104, the device 12 attempts to obtain a network address after it has become active on the network 14. For example, the device 12 attempts to request a static IP address from a DHCP server 18. This can be performed, for example, by sending out a broadcast request for a predetermined period of time before giving up (e.g., for two minutes or other appropriate period of time). In step 104, this attempt to obtain a network address is assumed to fail, with no response received from a network server. The device 12 then reverts to an invalid network address, e.g., invalid static IP address 192.168.70.125 of the DHCP protocol in a DHCP embodiment.

In step 106, the device 12 opens an additional communication port and enters a "listen" mode of the present invention. For example, the device 12 can open an additional Transmission Control Protocol (TCP) port (for TCP/IP network embodiments). The listen mode allows the device 12 to monitor the opened port for broadcast data received over the network 14 via other means, such as via subnet broadcasts. The device 12 thus goes into a waiting mode.

The method 100 then shifts to step 107, which is performed on the application 24 side of the method. In step 107, the application 24 receives an indication informing the application that the device 12 has failed to obtain a valid network address and has an invalid network address (this can also occur immediately after step 104). This can be implemented in a variety of ways. For example, a user, such as a network administrator, can detect or be alerted to the device's request and failure to obtain a network address in step 104 (e.g., in one situation, the user knows that there is no network server available and be aware when the device 12 is connected to the network). A user can then start the application 24 and inform it that such an event has occurred. In some embodiments, the application 24 can be started after the failure of step 104 occurs. In other embodiments, the application 24 can receive the indication from another system on the console 16 or a system connected via the network 14. In any case, the application 24 is also provided with a unique network identifier of the device 12, e.g., a hardware identifier such as a Media Access Control (MAC) address of the device. The hardware identifier for the device 12 herein is assumed to be known to the user (administrator) interfacing with the application 24, or is otherwise known or received by the application 24, e.g., communicated to the application 24 by the system on which it runs or another system. The hardware identifier allows the device 12 to be communicated with over the network 14 without using a valid network address it has failed to obtain.

In step 108, the application 24 sends a broadcast packet out on the network 14 to the network identifier (e.g., MAC address) of the device 12, wherein this packet includes address information of the application 24 on the network 14, and a network identifier (e.g., MAC address) of the system of application 24. The address information can include subnet information of the application. For example, when the network 14 is the Internet and there may be multiple network routers between the application 24 and the device 12, the application 24 can send out a subnet-directed broadcast packet to the device MAC address that includes the MAC address and subnet information of the application 24. The broadcast packet is subnet-directed, i.e., directed to the specific subnet of the device 12 on network 14, which is known to the application 24 via the user or a system. This allows the packet to pass through routers which would normally block full broadcast packets, and find the device 12 on its particular subnet. For example, a router on the network 14 passes the packet to another router, and assuming broadcast forwarding is enabled, the receiving router forwards the broadcast to another router, until the router of the subnet of the device 12 receives the packet and broadcasts the packet to its entire subnet. Similarly, the subnet information of the application 24 included in the broadcast packet allows the device 12 to send information back to the application 24 via subnet-directed broadcast.

In step 110, the device 12 receives the broadcast packet and determines it is meant for the device 12. This is determined by examining the destination address of the packet and finding that the packet's destination is only the MAC address of the device and thus is meant solely for the device 12. If the packet is not solely intended for the device 12, the device 12 keeps waiting in listen mode for such a packet. In step 112, after receiving the intended packet, the device 12 sends a subnet directed broadcast response packet back to the application 24, using the application's subnet information and MAC address found in the received packet. This response packet includes the device's current (invalid) network address, e.g., the invalid static IP address that it reverted to upon failure to get an address from a network server.

In step 114, the application 24 receives the response packet sent from the device 12, looks at the network address included in the packet, and verifies that the device's network address is invalid. If the address is determined to be invalid, then in step 116, the application 24 determines a valid network address to be assigned to the device, and sends a subnet directed configuration broadcast packet to the MAC address of the device 12, where the packet includes the valid network address. The valid network address is a network address that is determined by the administrator and is valid for the network. A valid network address for the device 12 can also be determined before receiving the response packet. In such a case, in some embodiments the application 24 can compare the determined address to the address received in the response packet; if the addresses are different, it is known that the device 12 has an invalid address.

In step 118, the device accepts the broadcast configuration packet, and reconfigures itself to use the new network address provided in the packet, e.g., as its static IP address. In step 120, the device 12 sends out a subnet directed broadcast acknowledgement packet back to the application 24 that indicates that the device received the configuration packet, reconfigured its network address, and will reboot; and the device then reboots so that the new address can take effect. In step 122, the application 24 receives the acknowledgement packet, and in step 124, the application waits for a predetermined period of time and then sends out a normal ping request to the device 12 as a test of the network connectivity of the newly configured device 12. The predetermined period of time can be any amount of time adequate to allow the device to reboot and/or reach a state where it can communicate normally over the network 14. For example, the application 24 can wait 30 seconds after receiving the acknowledgement packet. The normal ping request is sent as a standard addressed packet to the new network address of the device 12.

In step 126, the device 12 receives the ping request from the application 24, and in step 128, the device responds to the ping request using a standard address packet (for example, the return address can be included in the received ping request, as when using the IP protocol). In step 130, the application 24 receives the response to the ping request. Thus the application 24 knows that the configuring method has been successful.

If any of the response from the device 12 are not received by the application 24, various procedures can be taken, as desired. For example, the process can be repeated one or more times, an alert can be sent to the user indicating that remote configuration is not working, etc.

Although the present invention has been described in accordance with the embodiments shown, one or ordinary skill in the art will readily recognize that there could be variations to the embodiments and those variations would be within the spirit and scope of the present invention. Accordingly, many modifications may be made by one or ordinary skill in the art without departing from the spirit and scope of the appended claims.

What is claimed is:

1. A method for remotely configuring a device, the method comprising:
    attempting to obtain a network address from a network server over a network; and
    reverting to a predetermined default invalid network address in response to failing to obtain the network address from the network server;
    entering a listen mode after reverting to the predetermined default invalid network address, wherein the listen mode listens for a packet from a remote device; and
    receiving a valid network address over the network from a remote device connected to the network in response to failing to obtain the network address from the network server.

2. The method of claim 1 further comprising configuring the device to use the received valid network address as the network address of the device.

3. The method of claim 1 wherein the valid network address is provided in a broadcast packet that is broadcast from the remote device.

4. The method of claim 3 wherein the broadcast packet is subnet directed to the subnet of the device.

5. The method of claim 1 wherein the receiving a valid network address includes receiving a broadcast packet including a hardware address for the device.

6. The method of claim 5 wherein the receiving a valid network address includes sending a response packet to the remote device in response to the broadcast packet.

7. The method of claim 1 further comprising sending a response packet to the remote device in response to the valid network address and rebooting the device so that the valid network address takes effect.

8. The method of claim 1 further comprising receiving a request at the device from the remote device for a response over the network to demonstrate that the device is operating with the valid network address.

9. The method of claim 1 wherein the network server is a DHCP server and the network is an IP network.

10. A method for remotely configuring a device, the method comprising:
    receiving an indication at an application running on a remote device that the device has failed to obtain a network address from a network server over a network; and
    sending a broadcast packet to the device and receiving a response packet indicating that the device has reverted to having a predetermined default invalid network address after failing to obtain a network address; and
    sending a packet to be received by the device over the network, the packet including a valid network address for the device to allow the device to configure itself with the valid network address.

11. The method of claim 10 wherein the valid network address is provided in a broadcast packet that is broadcast to the device.

12. The method of claim 11 wherein the broadcast packet is subnet directed to the subnet of the device.

13. The method of claim 10 further comprising sending a broadcast request packet to the device using the hardware address of the device, the request packet including a return hardware address of the system of the application.

14. The method of claim 13 wherein the request packet is a subnet directed broadcast packet provided to the subnet of the device, and wherein the request packet includes subnet information of the system of the application.

15. The method of claim 10 wherein the device uses the sent valid network address as the network address of the device on the network.

16. The method of claim 10 further comprising receiving an acknowledgement from the device indicating the device has configured itself with the valid network address and is rebooting so that the valid network address takes effect.

17. The method of claim 16 further comprising waiting for a predetermined period of time after receiving the acknowledgement and sending a normal network request to the device to test the valid network address.

18. The method of claim 10 wherein the network server is a DHCP server and the network is an IP network.

19. An apparatus for remotely configuring a device, the apparatus comprising:
    a mechanism operative to attempt to obtain a network address from a network server over a network;
    a mechanism operative to revert to a predetermined default invalid network address in response to failing to obtain the network address from the network server;
    a mechanism operative to enter a listen mode after reverting to the predetermined default invalid network address, wherein the listen mode listens for a packet from a remote device; and
    a mechanism operative to receive a valid network address from a remote device connected to the device over the network in response to failing to obtain the network address from the network server.

20. The apparatus of claim 19 further comprising a mechanism operative to configure the device to use the received valid network address as the network address of the device.

21. The apparatus of claim 19 wherein the network server is a DHCP server and the network is an IP network, and the network address is a static IP address.

22. A computer readable storage device including program instructions to be implemented by a computer and for remotely configuring a device, the program instructions for:

receiving an indication at an application running on a remote device that the device has failed to obtain a network address from a network server over a network; and sending a broadcast packet to the device and receiving a response packet indicating that the device has reverted to having a predetermined default invalid network address after failing to obtain a network address; and sending a packet to be received by the device, the packet including a valid network address for the device to allow the device to configure itself with the valid network address.

* * * * *